United States Patent [19]

Brown

[11] 4,397,268
[45] Aug. 9, 1983

[54] ENGINE INTAKE AIR MOISTURIZER

[76] Inventor: Charles L. Brown, 8801 SW. 116th St., Miami, Fla. 33176

[21] Appl. No.: 305,083

[22] Filed: Sep. 24, 1981

[51] Int. Cl.³ .................... F02D 19/00; F02M 25/04
[52] U.S. Cl. ............................. 123/25 L; 123/25 R; 123/25 A; 261/18 A
[58] Field of Search ............. 123/25 R, 25 A, 25 E, 123/25 L, 198 A; 261/18 A

[56] References Cited

U.S. PATENT DOCUMENTS

| | | | |
|---|---|---|---|
| 2,843,216 | 7/1958 | Powell | 123/25 A |
| 3,834,360 | 9/1974 | Blitch | 123/25 A |
| 3,865,907 | 2/1975 | Roch | 123/25 L |
| 3,991,724 | 11/1976 | Geiser | 123/25 R |
| 3,996,902 | 12/1976 | Ri et al. | 123/25 L |
| 4,068,625 | 1/1978 | Brown | 123/25 A |
| 4,289,508 | 9/1981 | Robert | 123/25 A |
| 4,306,519 | 12/1981 | Schoenhard | 123/25 R |
| 4,306,520 | 12/1981 | Slaton | 123/25 L |

Primary Examiner—Ira S. Lazarus
Attorney, Agent, or Firm—Oltman and Flynn

[57] ABSTRACT

The present moisturizer for air going into a combustion process has a venturi passageway through a liquid permeable, porous, open-ended, annular body surrounded by liquid such as water and a valve in the venturi passageway. The valve is spring-biased toward the air inlet end of the venturi passageway to provide a maximum flow restriction at low volume demand. The valve deflects air outward against the inside wall of the porous body which defines the venturi passageway for the purpose of enhancing the withdrawal of moisture from the porous body, particularly at low volume demands. At progressively higher volume demands, the valve is displaced by the air toward the air outlet end of the venturi passageway to enlarge the effective open area of the passageway around the valve. Preferably, the valve operates to keep the air velocity through the venturi passageway substantially constant at different air flow demands.

8 Claims, 6 Drawing Figures

ENGINE INTAKE AIR MOISTURIZER

SUMMARY OF THE INVENTION

This invention relates to a moisturizer for connection to the air intake of any combustion process which includes any internal combustion engine.

U.S. Pat. No. 4,068,625 to Charles L. Brown discloses a moisturizer having a porous annular body with a venturi passageway between an air inlet at one end and an air outlet at the opposite end. This porous body is held in a water-filled housing. The venturi passageway in the porous body has a reduced diameter throat in which the pressure of air flowing through the passageway is at a minimum to draw water through the pores of the body into the air stream.

The present invention is directed to such a moisturizer having a novel valve for improving its performance, particularly at low air volume demands, or engine speeds. This valve arrangement includes a valve member positioned axially in the venturi passageway and displaceable along the passageway by air flowing through the passageway to vary the effective open area of the passageway around the valve. In all positions the valve member deflects air which would otherwise flow along the center of the passageway laterally outward toward the inside surface of the porous body which defines the venturi passageway. This enhances the transfer of moisture from the porous body into the air stream, in all air demand situations, as the valve member is positioned to minimize the effective open area of the venturi passageway.

A principal object of this invention is to provide a moisturizer for any type combustion, having a novel valve arrangement for improving its performance.

Another object of this invention is to provide a moisturizer having such a valve arrangement tending to maintain a substantially constant air velocity through the moisturizer at different flow demands.

Another object of this invention is to provide, an intake air moisturizer having an open-ended annular porous body defining a venturi passageway for air whose flow through the passageway draws moisture through the porous body and into the passageway, a novel valve arrangement in the venturi passageway for deflecting air outward toward the passageway surface of the porous body to improve the withdrawal of moisture into the air stream, at all flow demands.

Another object of this invention is to provide in such a moisturizer a valve arrangement as just described which restricts the air flow through the venturi passageway in proportion to the volumetric flow rate of air through the passageway, so that the flow restriction is held at a near constant in relation to demand.

Further objects and advantages of the present invention will be apparent from the following detailed description of several presently-preferred embodiments, which are illustrated in the accompanying drawings.

DESCRIPTION OF THE DRAWINGS

FIG. 6 is a longitudinal section through a moisturizer having a tapered valve for regulating the air flow.

Before explaining the disclosed embodiments of the present invention in detail, it is to be understood that the invention is not limited in its application to the details of the particular arrangements shown since the invention is capable of other embodiments. Also, the terminology used herein is for the purpose of description and not of limitation.

DETAILED DESCRIPTION

Figure 1:
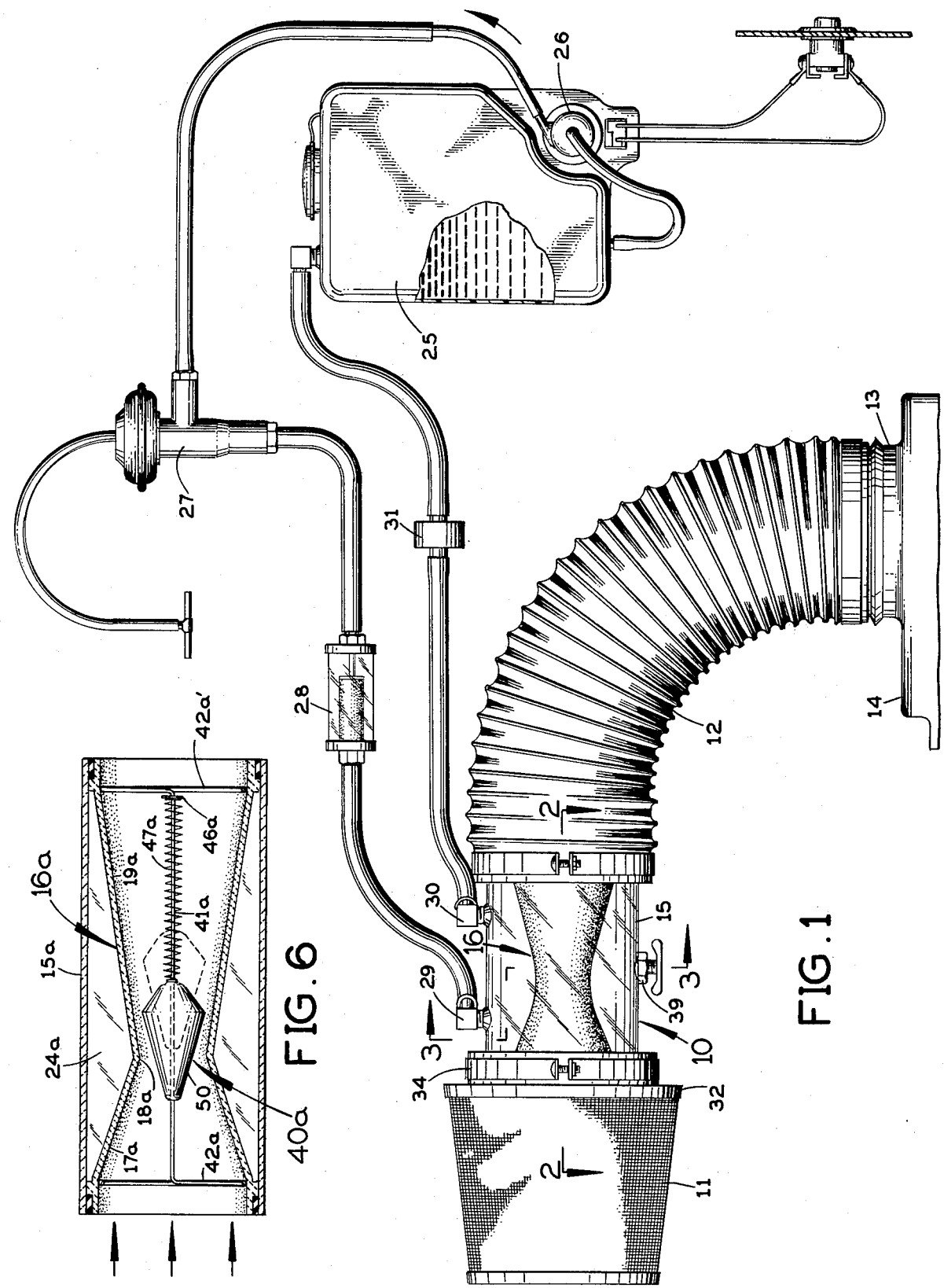
FIG. 1 is an elevational view of an engine moisturizing system which includes the moisturizer of the present invention.

Referring to FIG. 1, the moisturizer 10 of the present invention is connected between an air filter 11 and a flexible wire-reinforced hose 12 leading to the air intake 13 of an internal combustion engine.

The moisturizer 10 includes a cylindrical, rigid housing 15 (FIG. 2) and an open-ended, annular, water permeable, porous body 16 inside the housing 15. The porous body defines a venturi passageway having an inwardly entry segment 17 leading to a cylindrical throat 18 of reduced diameter, and an outwardly tapering outlet segment 19 extending away from the throat 18 on the opposite side.

At its air inlet end the porous body has a reduced diameter, short, cylindrical segment 20 at whose inner end a radially outwardly projecting, circumferential rib 21 engages the inside of the cylindrical housing 15. A sealing ring 22 is engaged in fluid-tight fashion between the cylindrical segment 20 of the porous body 16 and the inside of housing 15. This sealing ring presents a radially outwardly projecting annular flange 23 on its outer end which extends across the adjacent end face of housing 15. The flanged sealing ring 22, 23 is adhesively bonded to the housing 15 and the porous body 16 to provide a fluid-tight seal at the air inlet end of the moisturizer.

At its air discharge end the moisturizer has a similar sealed construction, the elements of which are given the same reference numerals but with a "prime" subscript added.

The porous body 16 which defines the venturi passageway may be of porous plastic, fired porous clay, porous and/or sintered metal, or any other suitable hygroscopic material through which a liquid can migrate for evaporation into the stream of air flowing through the venturi passageway.

An annular space 24 between the housing 15 and the porous body 16 is filled with liquid such as water supplied from a receptacle 25 (FIG. 1) by a pump 26 through a vacuum-operated valve 27, which opens when the internal combustion engine starts running, a filter 28, and an inlet fitting 29 on top of housing 15. An overflow fitting 30 on top of housing 15 passes any excess liquid from chamber 24 back to the receptacle 25 through a check valve 31. A drain fitting 39 on the bottom of the moisturizer housing 15 may be opened manually to empty liquid from the annular space 24 between the housing 15 and the porous body 16.

The air filter 11 at the air inlet end of the moisturizer is a generally frusto-conical porous body having interconnected, radially elongated convolutions in succession circumferentially. The larger end of the body of the air filter is adhesively bonded to a flanged mounting ring 32 of rubber-like material. A cylindrical spacer ring 33 is snugly received between the mounting ring 32 and the moisturizer housing 15. A flexible metal band 34 clamps the mounting ring 33 for the air filter 11 tightly clamped on the spacer ring 33. The smaller end of the filter 11 is closed.

The wire-reinforced flexible hose 12 is attached to the discharge end of the moisturizer by a similar clamping band 35. A cylindrical spacer ring 36 is engaged between the inside of hose 12 and the outside of housing 15 at this end of the moisturizer.

Figure 5:
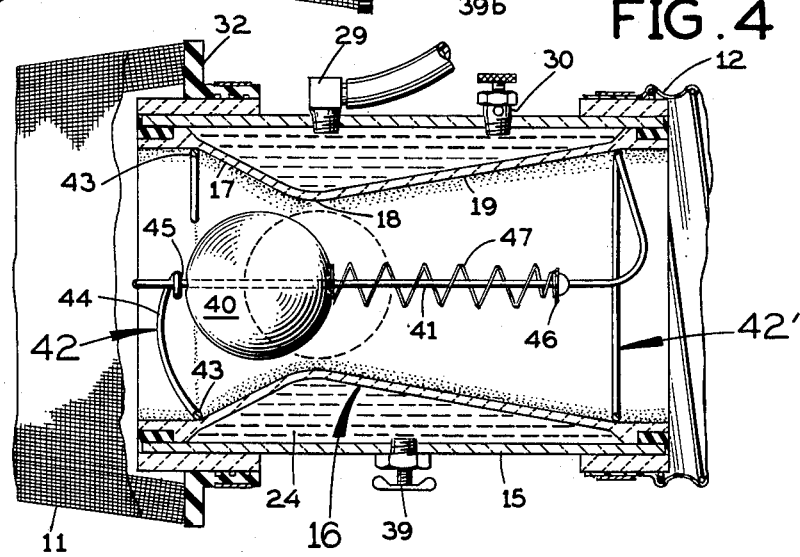
FIG. 5 is a longitudinal section through a moisturizer having an air flow-regulating ball valve in accordance with the present invention.

Referring to FIG. 5, which shows a slightly modified shape of the moisturizer, an air pressure-responsive valve is located in the venturi passageway through the moisturizer to control the air flow through it. In FIG. 5 this valve has a valve member in the form of a hollow, lightweight ball 40 slidably mounted on a rigid guide rod 41 extending axially along the venturi passage-way and rigidly supported at its opposite ends. The diameter of the ball valve member 40 is less than that of the throat 18 of the venturi passageway so that the ball valve member can move freely along the venturi passageway as the volumetric flow rate of air through the moisturizer changes in response to the operational demand it supplies with moisturized air.

Near the air inlet end of the venturi passageway the guide rod 41 is supported by a bent wire 42 having a circular outer turn 43 tightly engaging the inside of the porous body 16 at the beginning of the tapered entry segment 17 of the venturi passageway. One end of the outer turn 43 of this wire is connected to a laterally inwardly extending wire segment 44 which terminates in a hook-shaped extremity 45 that holds the guide rod 41 tightly. This extremity 45 of the bent wire 42 provides a limit stop for the ball valve member 42.

The opposite end of guide rod 41 carries a transverse enlargement 46 to which is welded the inner end of a bent wire 42' generally similar to the bent wire 42 already described. A coil spring 47 is engaged under light compression between the ball valve member 40 and the transverse enlargement 46 on this end of the guide rod. This spring biases the ball valve member 40 upstream along the venturi passageway, i.e., toward the air inlet end, against the limit stop 45 provided by the support wire 42 for the guide rod. In this position, shown in full lines in FIG. 5, most of the ball valve member 40 is within the tapered entry segment 17 of the venturi passageway, i.e., the center of the ball is at the upstream side of the reduced diameter throat 18 of the venturi passageway.

When the engine is running at its idling speed, the engine vacuum draws air through the venturi passageway of the moisturizer at a volumetric flow rate which causes the ball valve member 40 to be displaced to the phantom line position in FIG. 5, in which the center of the ball valve member is at the throat 18 of the venturi passageway. In this position, the ball valve member 40 provides the optimum flow restriction in the venturi passageway.

At progressively higher flow demands the ball valve member 40 is drawn farther to the right in FIG. 5 into the outwardly tapered discharge segment 19 of the venturi passageway. The higher the flow demands, the less flow restriction the ball valve member 40 provides in the venturi passageway because of the latter's expanding diameter to the right of its throat 18. This valve causes the air velocity through the venturi passageway to remain substantially constant at various air flow requirements which delivers a constant level of humidification. This action substantially improves the delivery of the consistent humidification necessary for most efficient combustion.

At low flow rates the present valve improves the performance of the moisturizer by deflecting air laterally outward to sweep along the inside face of the porous body 16 at and in the vicinity of the throat 18. This sweep of the air is more effective in picking up moisture migrating through the porous body 16 onto its inside face, which defines the venturi passageway, that would be the case if most of the air flow were taking place closer to the axial centerline of the venturi passageway, more remote from the inside face of the porous body 16, as it would in the absence of the valve 40.

FIG. 6 shows a moisturizer having a modified valve for the same purpose as the ball valve in FIG. 5. In FIG. 6 corresponding elements of the moisturizer are given the same reference numerals as in FIG. 5, but with an "a" suffix added.

The valve member 40a in FIG. 6 has a conical surface 50 with a taper which may be the same as the taper of the outlet segment 19a of the venturi passageway through the moisturizer. This conical surface 50 on the valve member faces toward the upstream end of the moisturizer, i.e., the end where air enters.

When flow demand is low, the oppositely directed forces exerted respectively by the air flowing from left to right in FIG. 6 along the venturi passageway and by the spring 41a cause the conical valve member 40a to be positioned at the full line position in FIG. 6. In this position, the conical face 50 of the valve member extends across the throat 18a of the venturi passageway and provides a relatively small annular path for air at the throat 18a and on the downstream side of the throat. At higher air flow the valve member 40a is displaced farther to the right in FIG. 6, such as to the position shown in phantom. As the valve member 40a moves farther to the right, the annular flow path between the conical valve face 50 and the inside of the porous body 16a becomes progressively wider.

The operation of the FIG. 6 valve is basically similar to that of the FIG. 5 valve, with the maximum effect of the valve occurring at low flow rates.

Figure 2:
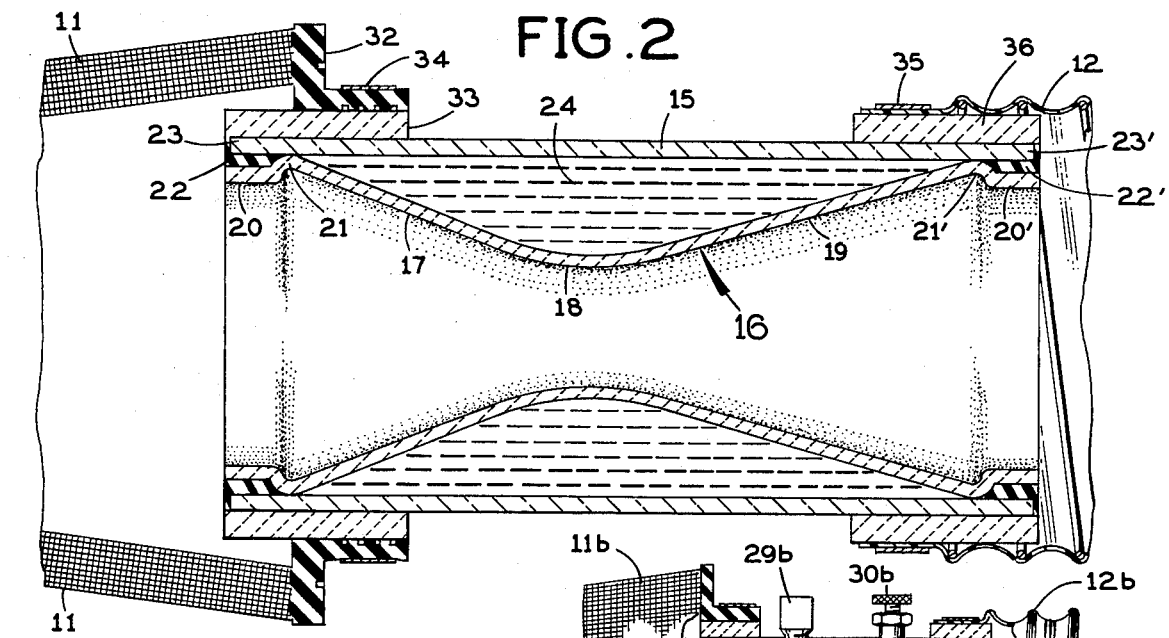
FIG. 2 is a longitudinal section through the moisturizer in the FIG. 1 system with the air flow-regulating valve omitted.
Figure 3:
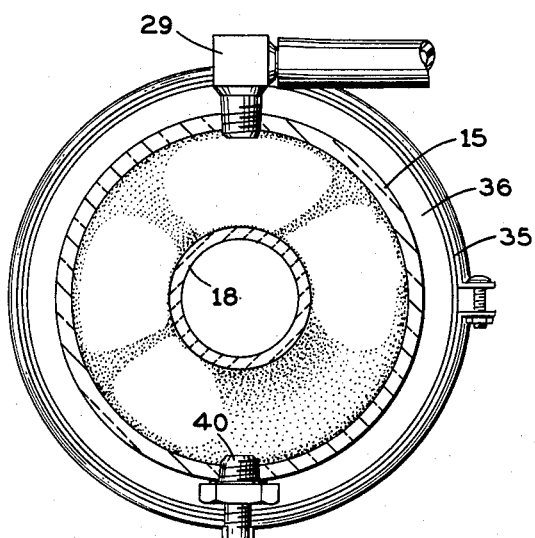
FIG. 3 is a cross-section through this moisturizer with valve omitted, taken along the line 3—3 in FIG. 1.
Figure 4:
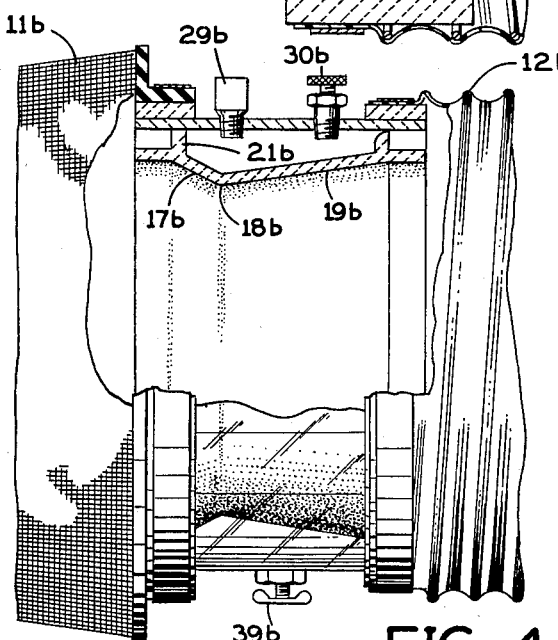
FIG. 4 is a longitudinal section through a modified moisturizer with the valve omitted.

FIG. 4 shows a modified construction of the moisturizer (with the air flow regulating valve omitted for clarity). Elements of this moisturizer which correspond to those of FIG. 2 are given the same reference numerals, but with a "b" suffix added. The moisturizer of FIG. 4 differs from that of FIG. 2 principally in the proportion between the axial and radial dimensions. In FIG. 4 the venturi passageway is much shorter axially in proportion to its radius than in FIG. 2. The moisturizer of FIG. 4 is especially well adapted for truck diesel engines. It is to be understood that the FIG. 4 moisturizer will include an air flow-regulating valve, such as the ball valve of FIG. 5 or the conical valve of FIG. 6, to vary the effective size of the venturi passageway depending upon the volumetric flow rate of air through this passageway, as determined by the demand.

I claim:

1. In a moisturizer for any combustion process, said moisturizer having:
   an open-ended housing for connection at one open end to the air intake of the carburetor, said housing having an air inlet opening at its opposite end;

an open-ended annular body inside said housing defining a venturi passageway between its ends for conducting air from said air inlet opening of the housing to said air intake of the carburetor, said body having a reduced diameter throat at which air pressure in said body is at a minimum, and having tapered portions at both axial sides of said throat tapering outwardly therefrom, said body for at least a portion of its extent being spaced from said housing to define therewith a liquid chamber at the outside of said body, said body at said latter portion of its extent being porous to pass moisture from said liquid chamber for evaporation into the air flowing through said venturi passageway, said venturi passageway providing increased migration of moisture through said body at said throat due to the reduction of air pressure at said throat;

and means on said housing for introducing liquid into said chamber;

the improvement which comprises valve means in said venturi passageway for varying the effective open area of said passageway around said valve means in accordance with the volumetric flow rate of air through said venturi passageway.

2. A moisturizer according to claim 1, wherein said valve means comprises a valve member mounted for displacement aixially along said venturi passageway, and spring means biasing said valve member toward the air inlet end of said venturi passageway.

3. A moisturizer according to claim 2, wherein said valve member is a ball of smaller diameter than said throat of the venturi passageway.

4. A moisturizer according to claim 3, wherein the bias force of said spring means is such that the ball is substantially centered in said throat of the venturi passageway when the engine is running at its idling speed.

5. A moisturizer according to claim 2, wherein said valve member has a conical surface facing toward the air inlet end of said venturi passageway and tapering in the same direction as the tapered portion of the venturi passageway on the air outlet side of said throat.

6. A moisturizer according to claim 1, wherein said valve means is operative to maintain substantially constant the air velocity through said venturi passageway at different volumetric flow rates.

7. In a moisturizer for any combustion process, said moisturizer having:

an open-ended annular body defining a venturi passageway having an air inlet at one end, an air outlet at the opposite end and a reduced diameter throat between said ends at which air pressure in said body is at a minimum, said body being porous in the vicinity of said throat to pass moisture into said venturi passageway in response to the flow of air through said passageway;

and means defining a chamber for holding liquid outside said annular body in the vicinity of said throat;

the improvement which comprises a valve member in said venturi passageway for deflecting air outward toward the wall of said passageway, said valve member being displaceable along said venturi passageway toward said air outlet in accordance with the volumetric flow rate of air through said passageway.

8. A moisturizer according to claim 7, and further comprising means biasing said valve member axially along said venturi passageway toward said air inlet to yieldably oppose the displacement of the valve member along the venturi passageway toward said air outlet in response to the flow of air through said venturi passageway.

* * * * *